(No Model.) 2 Sheets—Sheet 1.
L. I. & J. M. BODENHAMER.
FERTILIZER DISTRIBUTER AND GRAIN DRILL.
No. 500,557. Patented July 4, 1893.
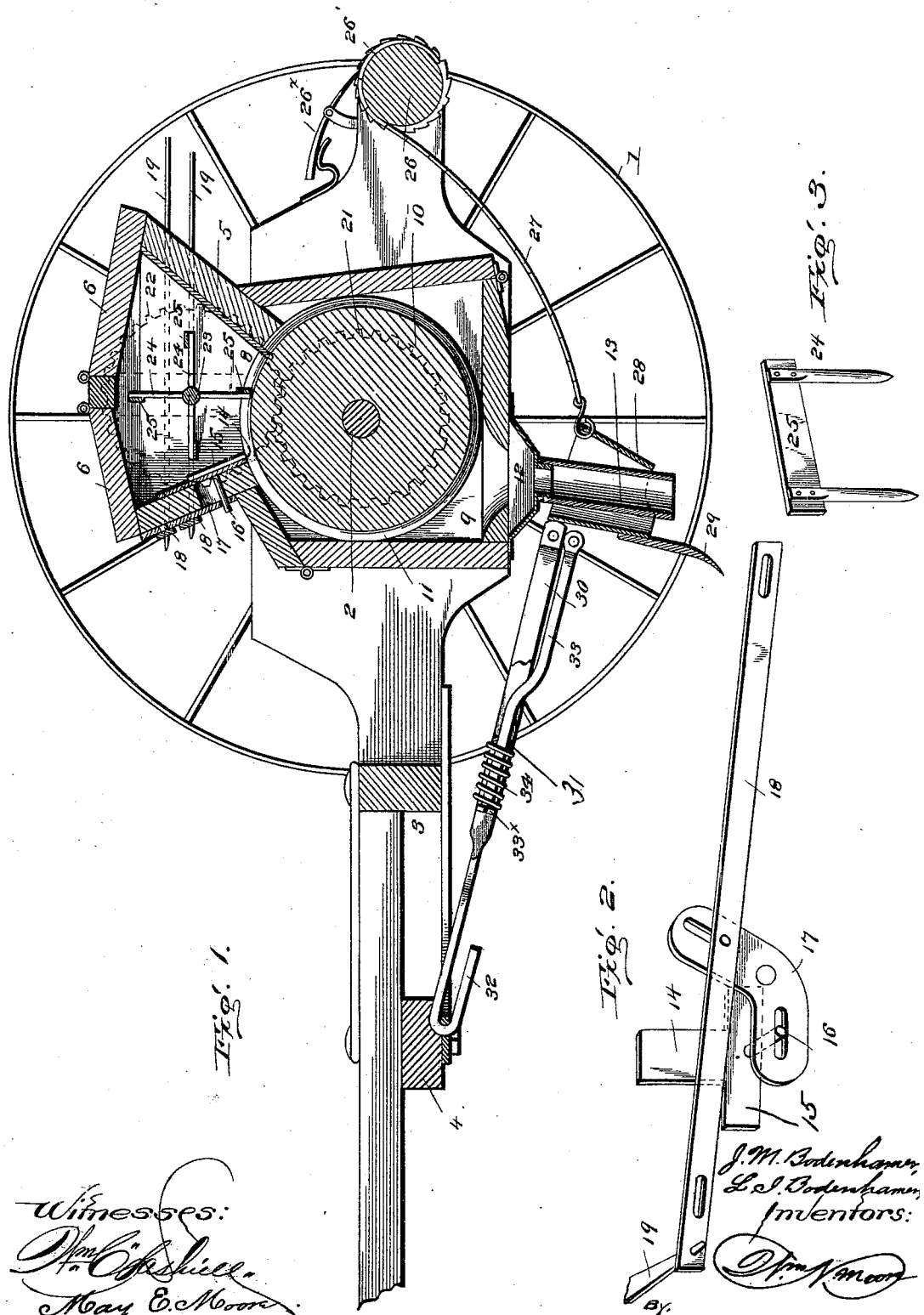
Witnesses:
Wm C. Ashill.
May E. Moor.
J. M. Bodenhamer,
L. I. Bodenhamer,
Inventors:
By.
Atty.

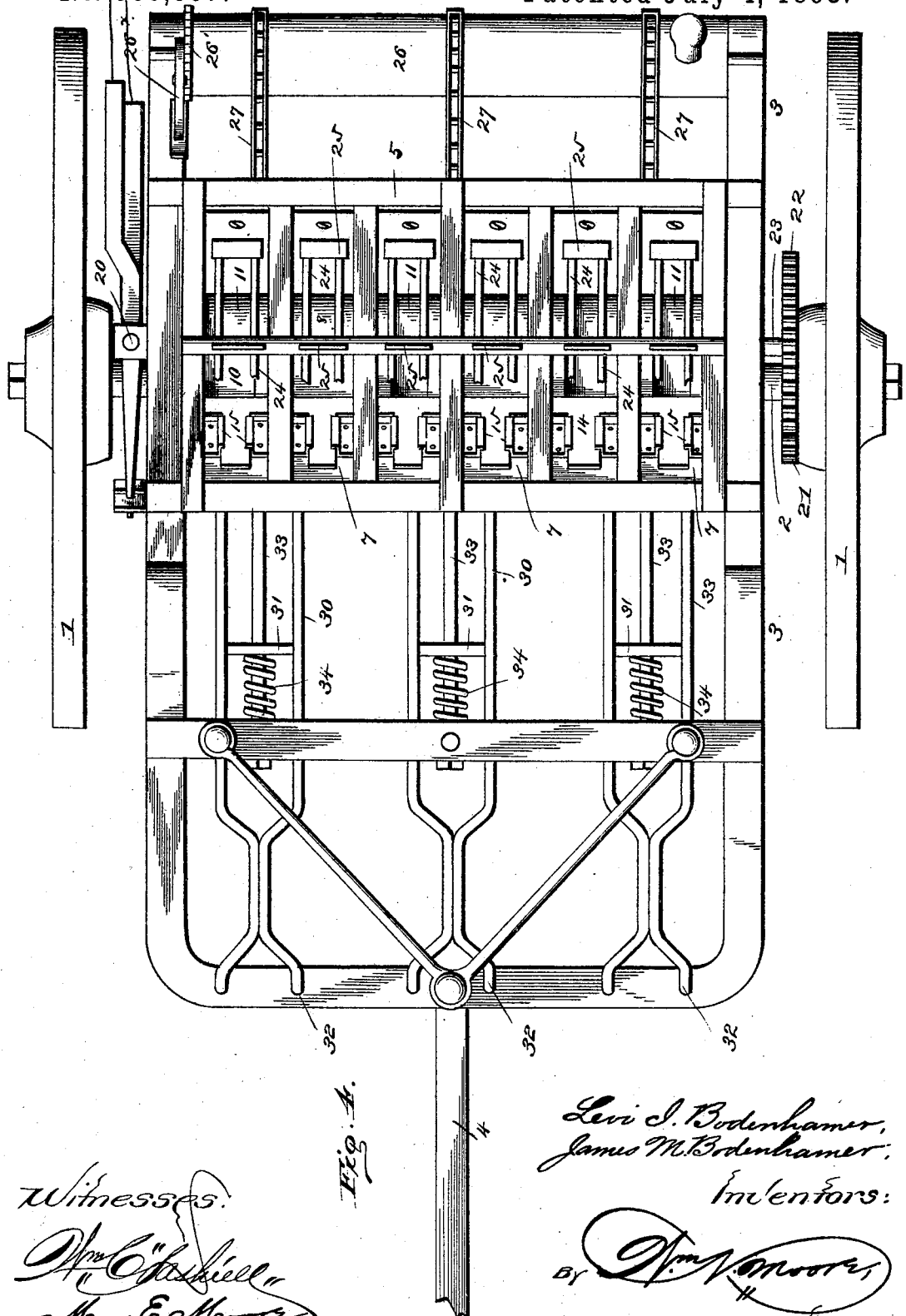

UNITED STATES PATENT OFFICE.

LEVI I. BODENHAMER AND JAMES MADISON BODENHAMER, OF KERNERSVILLE, NORTH CAROLINA.

FERTILIZER-DISTRIBUTER AND GRAIN-DRILL.

SPECIFICATION forming part of Letters Patent No. 500,557, dated July 4, 1893.

Application filed September 10, 1892. Serial No. 445,484. (No model.)

*To all whom it may concern:*

Be it known that we, LEVI I. BODENHAMER and JAMES MADISON BODENHAMER, citizens of the United States, residing at Kernersville, in the county of Forsyth and State of North Carolina, have invented certain new and useful Improvements in Fertilizer and Grain Drills; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in drills adapted for drilling grain and fertilizer, and the drill may be used in drilling grain alone or fertilizer alone or the two simultaneously as found desirable.

The leading object of our invention is the provision of a drill which will be composed of the fewest possible number of parts in order to render the improvement simple, strong and durable; which will be thoroughly efficient in operation and which can be produced at a comparatively low price, thus combining in an agricultural machine of this class all the features to render it practical and useful.

To attain the desired object the invention consists of a drill embodying novel features of construction, combination and adaptation of parts for service as fully disclosed herein.

In order that the construction in detail and the operation and advantages of our improvement may be readily understood and appreciated we have shown a drill constructed according to our invention in the accompanying drawings, in which—

Figure 1 represents a vertical longitudinal sectional view of the drill. Fig. 2 represents a detail view of one of the pivoted rocking levers attached to the bar for operating the slides. Fig. 3 represents a detail view of one of the scrapers or agitating devices detached, and Fig. 4 represents a top plan view of the drill with the covers of the hopper detached to clearly show relation of parts.

Referring by numerals to the drawings—the numeral 1 designates the supporting wheels; 2 the axle; and 3 the frame composed of the side pieces and the front transverse pieces or bars to which the shafts or pole 4, is attached. Mounted between the side pieces of the frame is the hopper 5, provided with hinged covers 6 and divided into a series of compartments 7 to receive the grain or fertilizer, and further provided with the discharge openings 8, communicating with the lower casing 9, in which is mounted on the axle the drum or cylinder 10, provided with the series of passages 11, which receive the grain or fertilizer and discharge it into the spouts 12, from whence it is delivered into the furrows by the flexible tubes 13, as is evident. From this construction it will be seen that the grain or fertilizer is placed within the hopper and passes through the openings therein into the channels of the drum and from thence is discharged into the tubes to the furrows, and in order to regulate the discharge we provide the vertical moving slides 14 fitting in cleats 15, and to which are connected the pins 16, which enter a slot in the lower end of the rock-levers 17, having their upper ends slotted for connection with the horizontal sliding-bars or plates 18, moved or operated by the hand-levers 19, fulcrumed at 20 to the hopper. There are two sets of slides as shown for permitting the discharge of the fertilizer or grain separately or the discharge of both simultaneously and the discharge of either can be regulated by moving the slides different distances to regulate the size of the discharge openings, as will be apparent.

To the axle or preferably to the hub of the wheel is rigidly secured the gear wheel 21, meshing with the gear wheel 22, on the agitator shaft 23, passing through the hopper, and this shaft carries a series of arms forming yokes or agitators 24, which are arranged in each compartment of the hopper, and carry the scraping plates 25, which when the shaft is rotated act as agitators and the scrapers positively force the grain or fertilizer down through the discharge openings, also keep the material in a loose state to render easy the feeding thereof and also force the material evenly through the discharge openings.

In the rear ends of the side pieces of the frame is mounted a roller or drum 26, to which are attached and adapted to be wound thereon the chains or flexible connections 27, the free or lower ends of which are connected to the conical tubes 28, carrying the drill points 29, and to the said conical tubes are connected the lower ends of the drag bars 30, having the transverse stop bars 31 and at their upper ends formed with hooks 32 connected with the front transverse bar of the frame, and also having their lower ends connected to the conical tubes or the bars 33, which pass through the cross-bars 31 and having around their upper ends the springs 34, which bear at their lower ends against said cross-bars and at their upper ends against a collar $33^\times$ on the bars 33.

From the construction described it will be seen that the drills are flexibly and resiliently connected between the chains and bars and that whenever the points come to an obstruction of any character it will easily pass over the obstruction without danger of damaging the drills or feed-tubes, and also that the drills may be adjusted or raised and lowered by the drum or roller and held in any adjusted position by the ratchet 26'' and spring-actuated pawl $26^\times$, which is a feature of importance.

It will thus be seen that we provide a simple, cheap and durable machine which can be effectively used in drilling grain or fertilizer separately or both together; can be accurately adjusted to cause the machine to drill any amount of material desired; can clear obstructions of any character without damaging the drills; which can be drawn with one or more horses and have any desired number of drills as circumstances require; will be positive in its feed and also feed smoothly and evenly; will permit the drills to be adjusted with ease and which is composed of very few parts and therefore not likely to get out of order by reason of the hard usage to which it is subjected.

We claim as our invention—

1. The combination of a frame, a casing mounted therein, feed spouts leading from said casing, a drum in the casing having channels, a hopper having compartments and having feed openings communicating with the channels of the drum, a shaft mounted in the hopper and carrying agitators, guides or cleats in the hopper, slides having reduced portions movable in the cleats and broadened ends for closing communication between the hopper and drum, pins connected to said slides, rock-arms having one end connected to said pins, and a longitudinal bar connected to the other end of said arms to rock the arms and operate the slides, for the purpose described.

2. The combination of a frame, a casing mounted therein, feed spouts leading from the casing, a drum in the casing for conducting the material to the spouts, a hopper communicating with the casing and drum, a shaft in the hopper having agitators, tubes surrounding the feed spouts and carrying drill points, the drag bars having the stop bars and having their forward ends connected to the frame and their inner ends connected to the said tubes, the bars having their inner ends also connected to the tubes and their outer ends passing through said stop bars, springs surrounding the extended ends of the bars, the flexible connections leading from the rear of the tubes, and the drum with pawl and ratchet for winding said flexible connections thereon, for the purpose described.

In testimony whereof we affix our signatures in presence of two witnesses.

LEVI I. BODENHAMER.
JAMES MADISON BODENHAMER.

Witnesses:
M. M. GOWANS,
WM. N. MOORE.